United States Patent
Takahashi et al.

(10) Patent No.: US 11,366,218 B2
(45) Date of Patent: Jun. 21, 2022

(54) VEHICLE SENSOR UNIT

(71) Applicant: TOYODA GOSEI CO., LTD., Kiyosu (JP)

(72) Inventors: Kazuhisa Takahashi, Kiyosu (JP); Koji Sakurai, Kiyosu (JP); Akihiro Misawa, Kiyosu (JP); Tadaoki Ichikawa, Kiyosu (JP); Hideto Maeda, Kiyosu (JP); Koji Okumura, Kiyosu (JP); Yasuhito Takeuchi, Kiyosu (JP); Shintaro Okawa, Kiyosu (JP); Hiroaki Ando, Kiyosu (JP); Yoshinori Yoshizawa, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 437 days.

(21) Appl. No.: 16/451,238

(22) Filed: Jun. 25, 2019

(65) Prior Publication Data
US 2020/0011989 A1  Jan. 9, 2020

(30) Foreign Application Priority Data

Jul. 6, 2018  (JP) .............................. JP2018-128753

(51) Int. Cl.
*G01S 13/86* (2006.01)
*G01S 13/931* (2020.01)
(Continued)

(52) U.S. Cl.
CPC .......... *G01S 13/867* (2013.01); *G01S 13/931* (2013.01); *B60R 11/04* (2013.01);
(Continued)

(58) Field of Classification Search
CPC ...... G01S 13/867; G01S 13/931; G01S 7/027; G01S 2013/93271; G01S 2013/93275;
(Continued)

(56) References Cited

U.S. PATENT DOCUMENTS 3,955,201 A * 5/1976 Crump .................. H01Q 1/425
343/701
4,312,002 A * 1/1982 Stewart .................. H01Q 1/42
343/725
(Continued)

FOREIGN PATENT DOCUMENTS

JP  2002116318 A  4/2002
JP  2004151069 A  5/2004
(Continued)

OTHER PUBLICATIONS

Extended European Search Report dated Dec. 13, 2019 issued in corresponding EP application No. 19183982.8.
(Continued)

*Primary Examiner* — Bernarr E Gregory
(74) *Attorney, Agent, or Firm* — Posz Law Group, PLC (57) ABSTRACT

A vehicle sensor unit includes a millimeter wave radar device, an infrared sensor that is arranged at a position adjacent to the millimeter wave radar device, and a cover having a first cover portion and a second cover portion. The first cover portion is located in front of the millimeter wave radar device in a transmission direction of the millimeter waves to conceal the millimeter wave radar device and has millimeter wave transparency. The second cover portion is located in front of the infrared sensor in a transmission direction of the infrared light to conceal the infrared sensor and has infrared light transparency. The millimeter wave radar device and the infrared sensor are attached to the cover so that the whole vehicle sensor unit is configured as a single unit.

9 Claims, 4 Drawing Sheets

(51) Int. Cl.
*B60R 11/04* (2006.01)
*B60R 11/00* (2006.01)
*G01S 7/02* (2006.01)

(52) U.S. Cl.
CPC ......... *B60R 2011/004* (2013.01); *G01S 7/027* (2021.05); *G01S 2013/93271* (2020.01)

(58) Field of Classification Search
CPC . G01S 13/86; G01S 7/02; B60R 11/04; B60R 2011/004; B60R 1/00; B60R 2300/8093; H01Q 1/42; H01Q 1/425
See application file for complete search history.

(56) References Cited

U.S. PATENT DOCUMENTS

| | | | | |
|---|---|---|---|---|
| 4,797,683 A * | 1/1989 | Kosowsky | ............... | H01Q 1/42 343/705 |
| 5,515,054 A * | 5/1996 | Radford | ................... | H01Q 1/42 342/53 |
| 6,307,521 B1 * | 10/2001 | Schindler | ................ | G01S 13/86 342/53 |
| 7,183,966 B1 * | 2/2007 | Schramek | ............... | G01S 17/87 244/3.1 |
| 8,773,300 B2 * | 7/2014 | Stratis | ...................... | H01Q 1/42 342/54 |
| 8,872,723 B2 * | 10/2014 | Lee | .......................... | H01Q 1/42 343/872 |
| 9,976,837 B2 * | 5/2018 | Boi | .......................... | H01Q 1/42 |
| 10,355,349 B2 * | 7/2019 | Rojanski | ............... | G01S 13/867 |
| 2002/0041968 A1 | 4/2002 | Sada et al. | | |
| 2015/0130671 A1 * | 5/2015 | Cordone | .................. | H01Q 1/42 343/705 |
| 2015/0130672 A1 * | 5/2015 | Cordone | .................. | H01Q 1/42 343/705 |
| 2016/0248152 A1 * | 8/2016 | Takao | .................... | G01S 13/931 |
| 2018/0231206 A1 * | 8/2018 | Hara | ..................... | G01S 13/931 |
| 2020/0300964 A1 | 9/2020 | Kasaba et al. | | |

FOREIGN PATENT DOCUMENTS

| | | |
|---|---|---|
| JP | 2010-135087 A | 6/2010 |
| JP | 2014134414 A | 7/2014 |
| JP | 2015-148537 A | 8/2015 |
| JP | 2016141355 A | 8/2016 |
| JP | 2016-206034 A | 12/2016 |
| JP | 2017-091321 A | 5/2017 |
| JP | 2017-175515 A | 9/2017 |
| WO | 2018/051909 A1 | 3/2018 |

OTHER PUBLICATIONS

Office Action dated Jun. 29, 2021 issued in corresponding JP Patent Application No. 2018-128753 (and English Translation).
Office Action dated Oct. 19, 2021 issued in corresponding JP Patent Application No. 2018-128753 (and English Translation).

* cited by examiner

VEHICLE SENSOR UNIT

BACKGROUND

1. Field

The present disclosure relates to a vehicle sensor unit that is installed at an outer end of a vehicle and has a function of detecting the environment of the vehicle.

2. Description of Related Art

To detect the environment of a vehicle, structures having a millimeter wave radar device and an infrared sensor arranged at an outer end such as the front end of a vehicle has been developed. A millimeter wave radar device has a sensor function of transmitting millimeter waves to the outside of the vehicle and receiving millimeter waves that have struck and been reflected by an object outside the vehicle such as a leading vehicle and pedestrians. The infrared sensor transmits infrared light to the outside of the vehicle and receives infrared light that has struck and been reflected by an object outside the vehicle. Such millimeter waves and infrared light are used to detect the distance to and the relative speed with respect to an object outside the vehicle. If the millimeter wave radar device and the infrared sensor are arranged in an exposed state, the millimeter wave radar device and the infrared sensor will be visible from outside the vehicle, which degrades the appearance. Thus, for example, in Japanese Laid-Open Patent Publication No. 2017-91321, a cover that conceals the millimeter wave radar device and has millimeter wave transparency is arranged in front of the millimeter wave radar device in the transmission direction of millimeter waves. In this publication, the cover prevents the millimeter wave radar device from being visible and improves the appearance.

However, if the millimeter wave radar device with a cover and the infrared sensor with a cover are installed at positions far away from each other at an outer end of the vehicle, a large installation space is required at the outer end, which poses a problem in mountability.

SUMMARY

Accordingly, it is an objective of the present disclosure to provide a vehicle sensor unit that is capable of improving the mountability by reducing the installation space while maintaining favorable appearance.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a vehicle sensor unit is provided that is configured to be installed at an outer end of a vehicle and having a function of detecting an environment of the vehicle. The vehicle sensor unit includes a millimeter wave radar device, an infrared sensor, and a cover. The millimeter wave radar device has a sensor function of transmitting millimeter waves to outside of the vehicle and receiving millimeter waves that have struck and been reflected by an object outside the vehicle. The infrared sensor is arranged at a position adjacent to the millimeter wave radar device and is configured to transmit infrared light to outside of the vehicle and to receive infrared light that has struck and been reflected by an object outside the vehicle. The cover has a first cover portion and a second cover portion. The first cover portion is located in front of the millimeter wave radar device in a transmission direction of the millimeter waves to conceal the millimeter wave radar device and has millimeter wave transparency. The second cover portion is located in front of the infrared sensor in a transmission direction of the infrared light to conceal the infrared sensor and has infrared light transparency. The millimeter wave radar device and the infrared sensor are attached to the cover so that the whole vehicle sensor unit is configured as a single unit.

In another general aspect, a vehicle sensor unit is provided that is configured to be installed at an outer end of a vehicle and having a function of detecting an environment of the vehicle. The vehicle sensor unit includes a millimeter wave radar device, an infrared sensor, a camera, and a cover. The millimeter wave radar device has a sensor function of transmitting millimeter waves to outside of the vehicle and receiving millimeter waves that have struck and been reflected by an object outside the vehicle. The infrared sensor is configured to transmit infrared light to outside of the vehicle and to receive infrared light that has struck and been reflected by an object outside the vehicle. The camera is configured to capture images of the environment of the vehicle. The cover has a first cover portion, a second cover portion, and a third cover portion. The first cover portion is located in front of the millimeter wave radar device in a transmission direction of the millimeter waves to conceal the millimeter wave radar device and has millimeter wave transparency. The second cover portion is located in front of the infrared sensor in a transmission direction of the infrared light to conceal the infrared sensor and has infrared light transparency. The third cover portion is located in front of the camera in an image capturing direction and has visible light transparency. Each of the millimeter wave radar device, the infrared sensor, and the camera is adjacent to at least one of the other two. The millimeter wave radar device, the infrared sensor, and the camera are attached to the cover so that the whole vehicle sensor unit is configured as a single unit.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

A vehicle sensor unit 20 according to an embodiment will be described with reference to FIGS. 1, 2A, and 2B.

In the following description, the direction in which a vehicle 10 travels forward will be referred to as the front, and the reverse direction will be referred to as the rear. The vertical direction refers to the vertical direction of the vehicle 10, and the lateral direction refers to the width direction of the vehicle 10 (vehicle width direction) that matches with the left-right direction when the vehicle 10 is traveling forward.

Figure 2A:
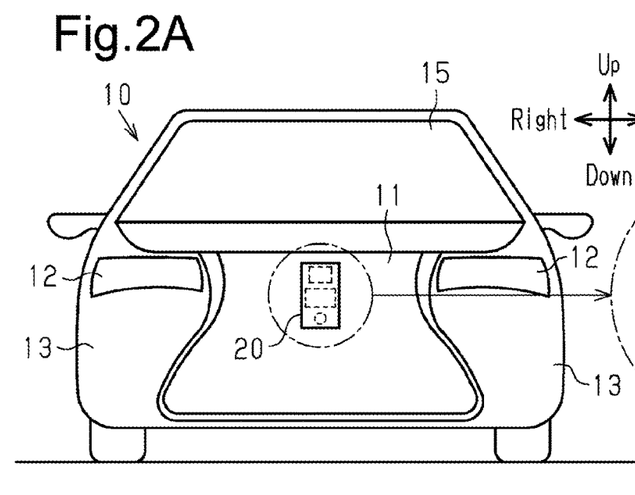
FIG. 2A is a front view of the vehicle equipped with the vehicle sensor unit of the embodiment installed in the upper portion of the radiator grille.

As shown in FIG. 2A, the vehicle 10 includes a radiator grille 11, a pair of headlights 12, and a pair of bumper-integrated fenders 13, which are attached to the front end of the body as vehicle exterior parts. The headlights 12 and the bumper-integrated fenders 13 are arranged on the left and right sides of the radiator grille 11. The radiator grille 11 has a function of guiding outside air such as relative wind to the radiator (not shown) to cool the radiator.

Figure 1:
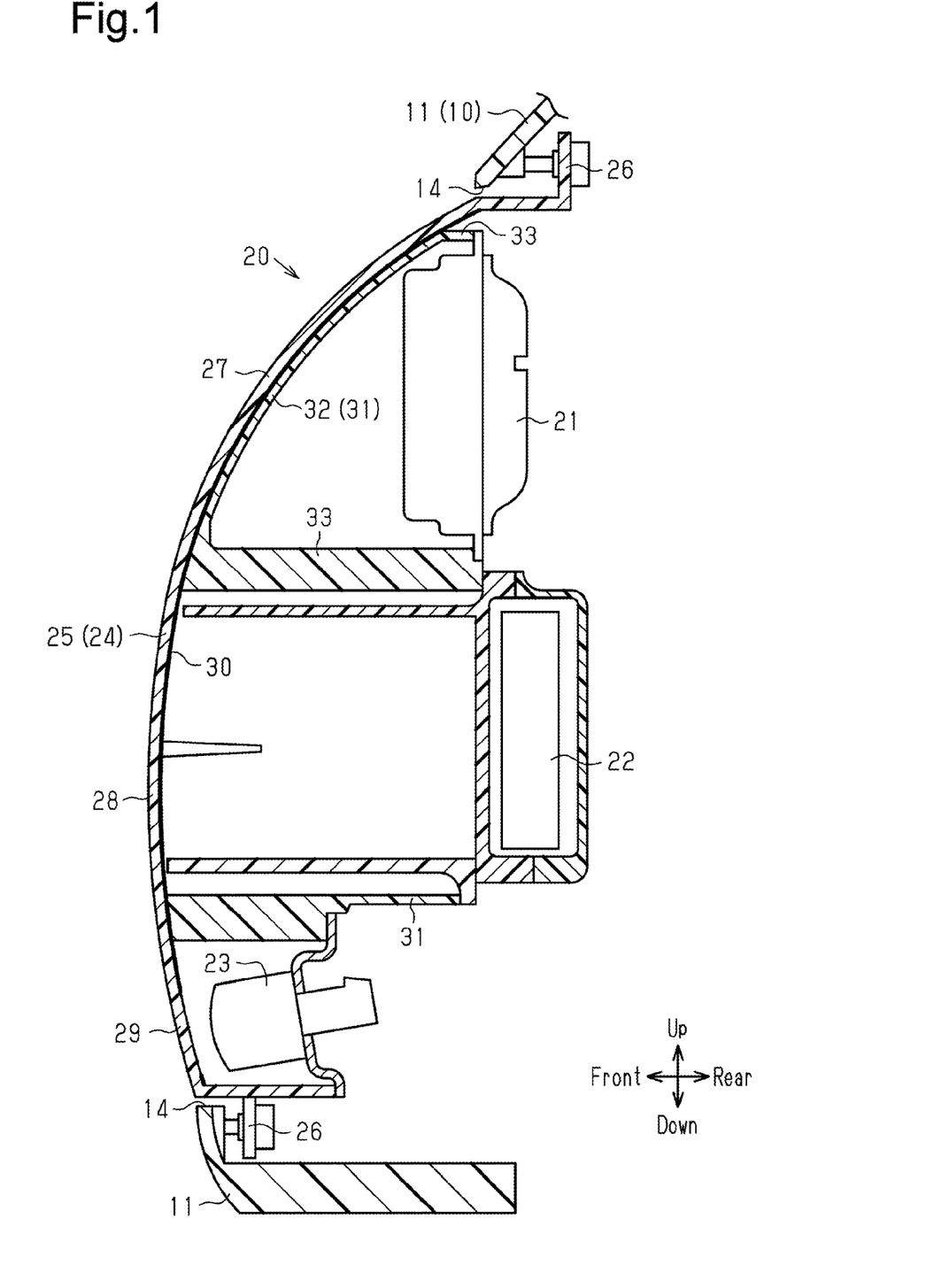
FIG. 1 is a partial cross-sectional side view of a vehicle sensor unit according to an embodiment, illustrating a state in which the vehicle sensor unit is installed in an upper portion of a radiator grille.
Figure 2B:
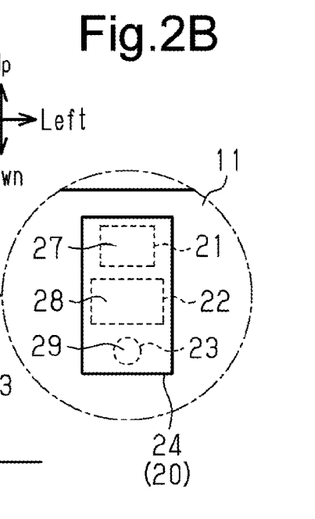
FIG. 2B is an enlarged front view illustrating a part of FIG. 2A.

Also, as shown in FIG. 1, a window 14 is opened in an upper portion of the radiator grille 11. The vehicle sensor unit 20, which has a function of detecting the environment of the vehicle 10, is installed between the window 14 and the radiator.

The vehicle sensor unit 20 includes a millimeter wave radar device 21, an infrared sensor 22, and a camera 23, which are arranged in a row in the vertical direction. The vehicle sensor unit 20 also includes a cover 24, which covers the millimeter wave radar device 21, the infrared sensor 22, and the camera 23 from the front. The vehicle sensor unit 20 is configured as a single unit by attaching the millimeter wave radar device 21, the infrared sensor 22, and the camera 23 to the cover 24.

The millimeter wave radar device 21 has a sensor function of transmitting millimeter waves toward a predetermined angular range in front of the vehicle 10 and receiving millimeter waves that have struck and been reflected by an object outside the vehicle 10. Millimeter waves are radio waves with wavelengths of 1 mm to 10 mm and frequencies of 30 GHz to 300 GHz. The millimeter wave radar device 21 detects the distance to and the relative speed with respect to the leading vehicle traveling in front of the vehicle 10 based on the time difference between the transmitted millimeter wave (transmitted wave) and the received millimeter wave (received wave), the strength of the received wave, and the like. The millimeter wave radar device 21 is characterized by being resistant to bad weather such as rain, fog, and snow, and having a longer measurable distance than other methods.

The infrared sensor 22 is a component that constitutes a part of the infrared radar device and is arranged at a position adjacent to and below the millimeter wave radar device 21. The infrared sensor 22 transmits infrared light toward an angular range wider than that of the millimeter wave radar device 21, and receives infrared light that has struck and been reflected by an object outside the vehicle 10 including a leading vehicle, a pedestrian, and the like. Infrared light is a kind of electromagnetic wave and has a longer wavelength than the wavelengths of visible light (0.36 μm to 0.83 μm). The infrared sensor 22 detects objects closer to the vehicle 10 than objects to be detected by the millimeter wave radar device 21. The infrared radar device measures the distance between the host vehicle (vehicle 10) and the leading vehicle and the relative speed with respect to the leading vehicle based on the transmitted infrared light (transmitted wave) and the received infrared light (received wave).

The camera 23 is arranged at a position adjacent to and below the infrared sensor 22. The camera 23 is arranged outside the detection range of the millimeter wave radar device 21 and the detection range of the infrared sensor 22. The detection range of the millimeter wave radar device 21 is the range through which the millimeter waves transmitted from the millimeter wave radar device 21 pass and is also the range through which the millimeter waves that have struck and been reflected by an object pass. The detection range of the infrared sensor 22 is the range through which the infrared light transmitted from the infrared sensor 22 passes, and the range through which the infrared light that has struck and been reflected by an object passes.

In the vehicle sensor unit 20, the millimeter wave radar device 21 and the camera 23 are adjacent to the infrared sensor 22. That is, the infrared sensor 22 is adjacent to both the millimeter wave radar device 21 and the camera 23.

The cover 24 is formed to be more elongated in the vertical direction than in the lateral direction, and is arranged in the window 14 of the radiator grille 11. The cover 24 has a cover main body 25 and a support portion 31 located behind the cover main body 25. The cover main body 25 constitutes the main part of the cover 24.

The cover main body 25 is formed in a plate shape using a transparent plastic such as polycarbonate (PC) plastic, polymethacrylic acid methyl (PMMA) plastic, or cycloolefin polymer (COP) plastic, and has transparency to millimeter waves, infrared light, and visible light. Most of the cover main body 25 is curved so as to bulge forward. The front surface of the cover main body 25 is exposed to the outside of the vehicle 10 through the window 14.

A decorative layer 30, which has transparency to millimeter waves and infrared light, is formed on substantially the entire rear surface of the cover main body 25. The decorative layer 30 is composed of a colored coating film such as a black film. A bright decorative layer may be formed on substantially the entire rear surface of the cover main body 25 instead of a black coating, and this may be used as the decorative layer 30.

In addition, the cover main body 25 may be formed using a colored plastic material. Colored plastic material refers to a material obtained by coloring plastic by mixing colorant such as pigment into a plastic material or by mixing a bright material together with colorant into plastic material.

The cover main body 25 has mounting portions 26, which are provided at least at the upper end and the lower end. The cover main body 25 is attached to a part of the radiator grille 11 or the vehicle body, specifically to a part around the window 14 at the mounting portions 26 by engagement using clips, screws, or hooks.

The support portion 31 is formed to be colored, for example, black with plastic material such as an acrylonitrile-ethylene-styrene copolymer (AES) plastic, which has substantially the same relative permittivity as a PC plastic.

A part of the support portion 31 is provided with a cover plate portion 32 and a support projection 33 formed on the rear side of the upper portion of the cover main body 25. The cover plate portion 32 is formed on the rear surface of the cover main body 25 in a region including at least an irradiation region irradiated with millimeter waves by the millimeter wave radar device 21. The support projection 33 is formed on the rear surface of the cover plate portion 32 outside the irradiation region. The millimeter wave radar device 21 is attached to the rear end of the support projection 33.

At least in a part of the cover 24 that corresponds to the irradiation region of millimeter waves by the millimeter wave radar device 21, the total thickness T of the cover main body 25, the decorative layer 30, and the cover plate portion 32 is set uniform to a value satisfying the following equation 1, and this part has millimeter wave transparency.

$$T = \{\lambda e2\}/\sqrt{(\varepsilon p)}\}n \quad \text{(Expression 1)}$$

where λe represents the wavelength of millimeter waves, εp represents the relative permittivity of the cover main body 25 (or the cover plate portion 32), and n represents an integer.

Thus, the thickness T is set to an integral multiple of the value obtained by dividing the half wavelength of the millimeter waves by the square root of the relative permittivity.

The upper part of the cover 24 that is located in front of the millimeter wave radar device 21 in the transmission direction of millimeter waves constitutes a first cover portion 27. In other words, the first cover portion 27 is constituted by a portion in which the thickness T is uniformly set and that is constituted by the cover main body 25, the decorative layer 30, and the cover plate portion 32. In the first cover portion 27, the decorative layer 30 prevents the millimeter wave radar device 21 from being visible from outside the vehicle 10 through the cover 24. Also, the first cover portion 27 has millimeter wave transparency. Therefore, the millimeter waves transmitted from the millimeter wave radar device 21 can transmit through the first cover portion 27, and millimeter waves that have struck and been reflected by an object outside the vehicle 10 can also transmit through the first cover portion 27.

Unlike the case with the millimeter wave radar device 21, there is no part corresponding to the cover plate portion 32 in front of the infrared sensor 22. A part of the cover 24 that is located in front of the infrared sensor 22 in the transmission direction of infrared light and is located below and adjacent to the first cover portion 27 constitutes a second cover portion 28. In other words, the part constituted by the cover main body 25 and the decorative layer 30 constitutes the second cover portion 28. In the second cover portion 28, the decorative layer 30 prevents the infrared sensor 22 from being visible from outside the vehicle 10 through the cover 24. Also, the second cover portion 28 has infrared light transparency. Therefore, infrared light transmitted from the infrared sensor 22 can transmit through the second cover portion 28, and infrared light that has struck and been reflected by an object outside the vehicle 10 can transmit through the second cover portion 28.

A part of the support portion 31 is formed in a lower portion of the cover main body 25. The infrared sensor 22 and the camera 23 are attached to the support portion 31 and the like. A part of the cover 24 that is located in front of the camera 23 in the image capturing direction and is located below and adjacent to the second cover portion 28 constitutes a third cover portion 29. Although the decorative layer 30 is formed on substantially the entire rear surface of the cover main body 25 as described above, the decorative layer 30 is not formed in front of the camera 23. The part of the cover main body 25 on which the decorative layer 30 is not formed has visible light transparency. This allows the camera 23 to capture images of the surrounding of the vehicle 10 through the external light transmitting through the third cover portion 29.

It is desirable that a camera having the same color (black) as the decorative layer 30 be used as the camera 23. In this case, although the camera 23 is visible from outside the vehicle 10 (from the front of the vehicle 10) through the cover main body 25, the camera 23 is inconspicuous.

The front surface of the first cover portion 27 and the front surface of the second cover portion 28 are connected to each other while being flush with each other. The front surface of the second cover portion 28 and the front surface of the third cover portion 29 are connected to each other while being flush with each other.

The vehicle 10 has an electronic control unit (not shown). The millimeter wave radar device 21, the infrared light radar device, and the camera 23 are connected to the electronic control unit. The electronic control unit executes various types of processes to support the driving of the vehicle 10 according to the environment of the vehicle 10, which is obtained from output signals of the millimeter wave radar device 21, the infrared light radar device, and the camera 23. The processes include a process of warning that the vehicle 10 may deviate from the lane, a process of warning that the vehicle 10 may collide, and a process of automatically adjusting the distance between vehicles.

An operation and advantages of the vehicle sensor unit 20 according to the above-described embodiment will now be described.

The millimeter wave radar device 21 of the vehicle sensor unit 20 transmits millimeter waves to the outside of the vehicle 10. The millimeter waves pass through the first cover portion 27 of the cover 24, which is located in front of the millimeter wave radar device 21 in the transmission direction of millimeter waves. The millimeter waves that have struck and been reflected by an object such as another vehicle or an obstacle ahead in the millimeter wave transmission direction and transmit through the first cover portion 27 are received by the millimeter wave radar device 21.

Also, the infrared sensor 22 of the vehicle sensor unit 20 transmits infrared light to the outside of the vehicle 10. The infrared light transmits through the second cover portion 28 of the cover 24, which is located in front of the infrared sensor 22 in the transmission direction of the infrared light. The infrared light that has struck and been reflected by an object such as another vehicle or an obstacle ahead in the infrared light transmission direction and transmits through the second cover portion 28 is received by the infrared sensor 22.

Also, images of the external environment of the vehicle 10 are captured by the camera 23 through the third cover portion 29.

Furthermore, the decorative layer 30 of the first cover portion 27 prevents the millimeter wave radar device 21 from being visible from the front in the transmission direction of millimeter waves. The decorative layer 30 of the second cover portion 28 prevents the infrared sensor 22 from being visible from the front in the transmission direction of infrared light. Accordingly, the appearance of the vehicle sensor unit 20 and its surroundings is improved.

If the millimeter wave radar device 21, the infrared sensor 22, and the camera 23 were arranged at positions away from each other at an outer end of the vehicle 10, the millimeter wave radar device 21 would require a cover with the first cover portion 27. The infrared sensor 22 would require a cover having the second cover portion 28 separately from the cover of the millimeter wave radar device 21. The camera 23 would require a cover having the third cover portion 29 separately from the cover of the millimeter wave radar device 21 and the cover of the infrared sensor 22. Therefore, the outer end of the vehicle 10 would require a large space to install the millimeter wave radar device 21 with the cover, the infrared sensor 22 with the cover, and the camera 23 with the cover. In particular, a mounting portion for attaching each cover to the vehicle body would be required for each cover, so that a larger installation space is required as a whole.

In this regard, the millimeter wave radar device 21 and the camera 23 are each adjacent only to the infrared sensor 22 in the present embodiment. That is, the infrared sensor 22 is adjacent to both the millimeter wave radar device 21 and the camera 23. In other words, each of the millimeter wave radar device 21, the infrared sensor 22, and the camera 23 is arranged adjacent to at least one of the other two. The first cover portion 27, the second cover portion 28, and the third cover portion 29 are respectively constituted by parts of the common cover 24. In this manner, the millimeter wave radar device 21, the infrared sensor 22, the camera 23, the first cover portion 27, the second cover portion 28, and the third cover portion 29 are aggregated at a single position, making the vehicle sensor unit 20 compact and reducing the installation space. In particular, since fewer number of mounting portions for mounting the cover 24 to the vehicle body is required, the installation space is reduced.

Further, in the present embodiment, the first cover portion 27 is adjacent to the second cover portion 28. Further, the second cover portion 28 is adjacent to the third cover portion 29. This reduces the size of the cover 24, which has the first cover portion 27, the second cover portion 28, and the third cover portion 29, making the vehicle sensor unit 20 even more compact.

Furthermore, the front surface of the first cover portion 27, the front surface of the second cover portion 28, and the front surface of the third cover portion 29 constitute a part of the decorative surface of the vehicle sensor unit 20 and thus constitute a part of the decorative surface of the front end of the vehicle 10, so as to be connected together smoothly. This further improves the appearance of the cover 24 and thus the appearance of the vehicle sensor unit 20.

In general, the radiator grille 11 has a function of guiding outside air such as relative wind from the front to the radiator in order to cool the radiator. When the vehicle sensor unit 20 is installed in the radiator grille 11, the vehicle sensor unit 20 interferes with the flow of the outside air in the radiator grille 11. However, in the present embodiment, the vehicle sensor unit 20 is compact and requires a small installation space as described above, so that the vehicle sensor unit 20 is less likely to block the flow of the outside air in the radiator grille 11. The downsizing of the vehicle sensor unit 20 is effective in ensuring the passage through which the outside air flows in the radiator grille 11.

In addition to the ones listed above, the present embodiment has the following advantages.

In the present embodiment, the camera 23 is arranged in a space inward of the radiator grille 11. Specifically, the camera 23 is located at a position outside the detection range of the millimeter wave radar device 21 and outside the detection range of the infrared sensor 22. Therefore, the camera 23 is capable of capturing images around the vehicle 10 without interfering with detection by the millimeter wave radar device 21 or detection by the infrared sensor 22.

The present embodiment is advantageous in the following points over a case in which the millimeter wave radar device 21 and the infrared sensor 22 are placed adjacent to each other, and the camera 23 is placed far away from both the millimeter wave radar device 21 and the infrared sensor 22 (hereinafter referred to as "comparative example"). In this comparative example, it is assumed that the first cover portion 27 and the second cover portion 28 are configured as part of the same cover.

In this comparative example, the cover having the third cover portion 29 is required separately from the cover having both the first cover portion 27 and the second cover portion 28. At the outer end of the vehicle 10, a space for installing the millimeter wave radar device 21, the infrared sensor 22, a cover for the millimeter wave radar device 21 and the infrared sensor 22, the camera 23, and a cover for the camera 23 is required, so that a large installation space as a whole is required.

In contrast, in the present embodiment, the camera 23 is attached to the cover 24 to be arranged at a position adjacent to one of the millimeter wave radar device 21 and the infrared sensor 22 (infrared sensor 22). In addition to the first cover portion 27 and the second cover portion 28, the third cover portion 29 is also composed of a part of the same cover 24. Thus, in addition to the millimeter wave radar device 21, the infrared sensor 22, the first cover portion 27, and the second cover portion 28, the camera 23 and the third cover portion 29 are aggregated at a single position. Therefore, even in this case, the vehicle sensor unit 20 is configured compactly, and the installation space is reduced as in the above-described case.

The above-described embodiment may be modified as follows. In the description of the modifications, like or the same reference numerals are given to those components that are like or the same as the corresponding components described-above embodiment and detailed explanations are omitted.

The positions of the millimeter wave radar device 21, the infrared sensor 22, and the camera 23 in the vertical direction may be changed on condition that the vehicle sensor unit 20 is installed in the upper portion of the radiator grille 11, and the millimeter wave radar device 21, the infrared sensor 22, and the camera 23 are arranged in a row in the vertical direction.

Figure 3A:
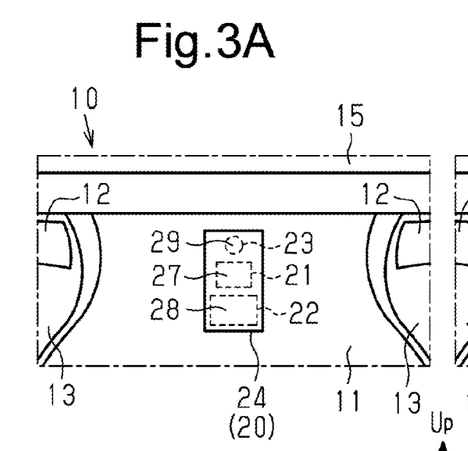
FIGS. 3A to 3D are enlarged front views each illustrating a vehicle in which a vehicle sensor unit of a modification is installed in an upper portion of a radiator grille.

FIG. 3A shows a modification in which the camera 23, the millimeter wave radar device 21, and the infrared sensor 22 are arranged in order from top to bottom. In this case, the millimeter wave radar device 21 and the infrared sensor 22 are adjacent to each other, and the camera 23 is adjacent only to the millimeter wave radar device 21. The positional relationship between the millimeter wave radar device 21 and the infrared sensor 22 in the vertical direction may be changed to be reversed from that in FIG. 3A.

Figure 3B:
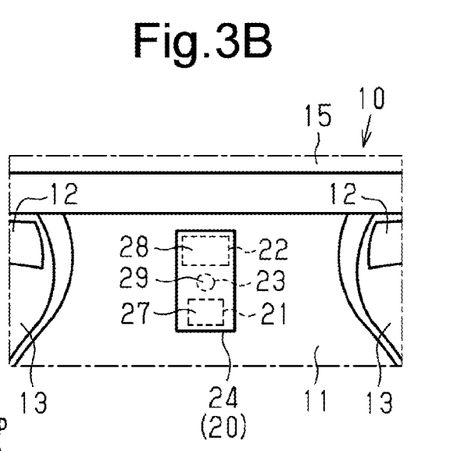

FIG. 3B shows a modification in which the infrared sensor 22, the camera 23, and the millimeter wave radar device 21 are arranged in order from top to bottom. In this case, the camera 23 is arranged between the infrared sensor 22 and the millimeter wave radar device 21. The infrared sensor 22 and the millimeter wave radar device 21 are not adjacent to each other, and the camera 23 is adjacent to both the infrared sensor 22 and the millimeter wave radar device 21. The millimeter wave radar device 21 may be above and adjacent to the camera 23 and the infrared sensor 22 may be below and adjacent to the camera 23 on condition that the camera 23 is positioned at the center in the vertical direction.

In the modifications of FIG. 3A and FIG. 3B, the vertical positions of the first cover portion 27, the second cover portion 28, and the third cover portion 29 in the cover 24 are also changed, so that the transparency of the cover 24 is ensured.

The millimeter wave radar device 21, the infrared sensor 22, and the cameras 23 may be arranged in a row in the lateral direction on condition that the vehicle sensor unit 20 is installed in the upper portion of the radiator grille 11.

Figure 3C:
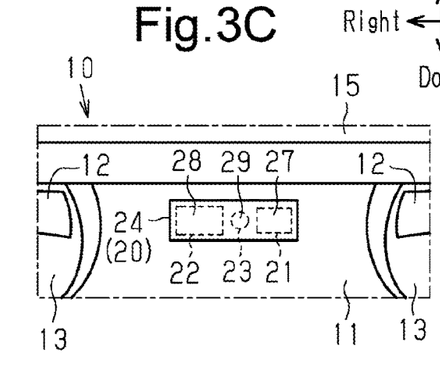

FIG. 3C shows a modification in which the infrared sensor 22, the camera 23, and the millimeter wave radar device 21 are arranged in order from right to left. In this case, the camera 23 is arranged between the infrared sensor 22 and the millimeter wave radar device 21. The infrared sensor 22 and the millimeter wave radar device 21 are not adjacent to each other, and the camera 23 is adjacent to both the millimeter wave radar device 21 and the infrared sensor 22. The millimeter wave radar device 21 may be on the right of and adjacent to the camera 23 and the infrared sensor 22 may be on the left of and adjacent to the camera 23 on condition that the camera 23 is positioned at the center in the lateral direction.

Figure 3D:
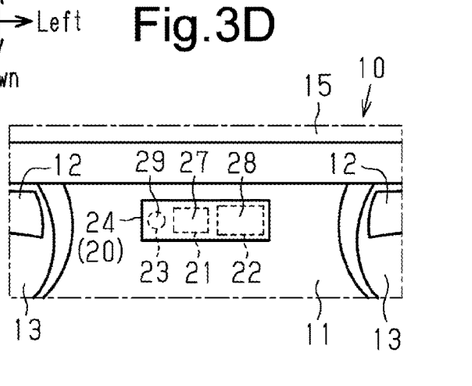

FIG. 3D shows a modification in which the camera 23, the millimeter wave radar device 21, and the infrared sensor 22 are arranged in order from right to left. In this case, the millimeter wave radar device 21 and the infrared sensor 22 are adjacent to each other, and the camera 23 is adjacent only to the millimeter wave radar device 21. The camera 23 may be adjacent only to the left side of the infrared sensor 22. The positional relationship between the millimeter wave radar device 21 and the infrared sensor 22 in the lateral direction may be changed to be reversed from that in FIG. 3D.

In the modifications of FIG. 3C and FIG. 3D, the lateral positions of the first cover portion 27, the second cover portion 28, and the third cover portion 29 in the cover 24 are also changed, so that the transparency of the cover 24 is ensured.

The camera 23 may be removed from the vehicle sensor unit 20. In this case, the camera 23 may be attached to the upper portion of a windshield 15 as shown in FIG. 4A.

Figure 4A:
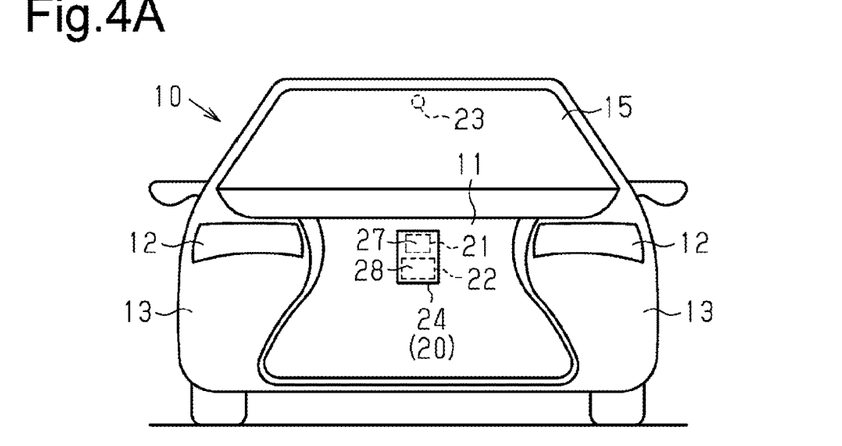
FIG. 4A is a front view of a vehicle equipped with a vehicle sensor unit of a modification installed in an upper portion of the radiator grille.
Figure 4B:
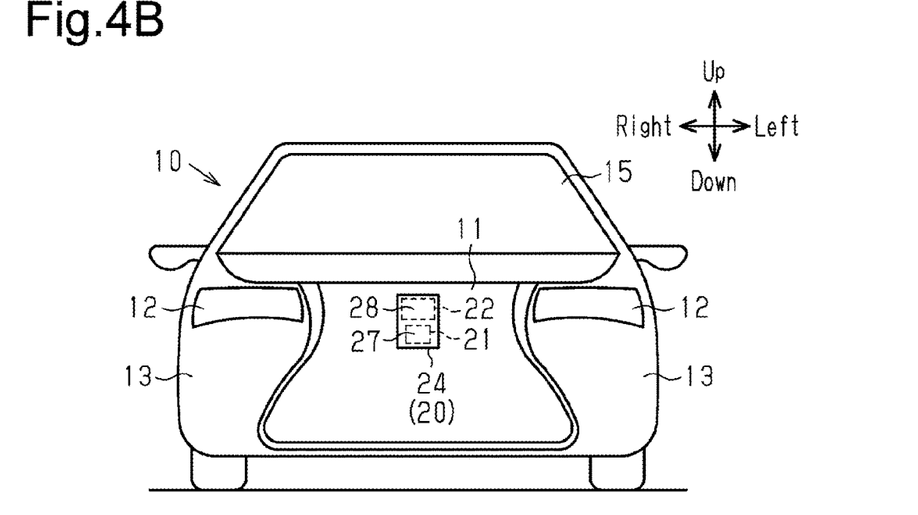
FIG. 4B is a front view of a vehicle equipped with a vehicle sensor unit of a modification installed in an upper portion of the radiator grille.
Figure 4C:
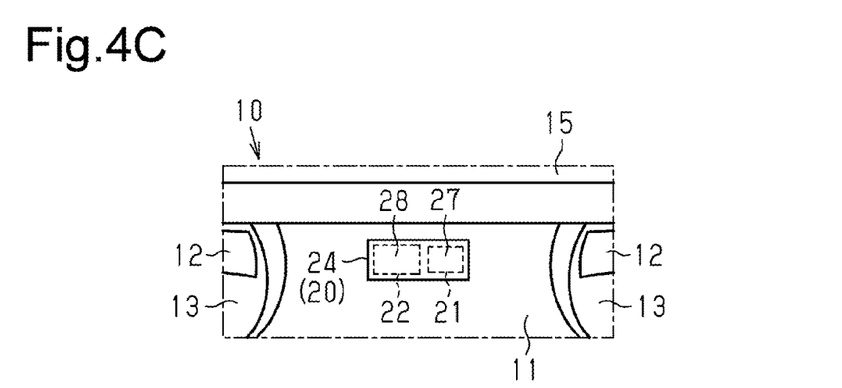
FIG. 4C is a partial front view of a vehicle equipped with a vehicle sensor unit of a modification installed in an upper portion of the radiator grille.

Also, as shown in FIGS. 4B and 4C, the camera 23 may be omitted from both of the vehicle sensor unit 20 and the windshield 15. FIG. 4B shows a modification in which the millimeter wave radar device 21 and the infrared sensor 22 are arranged vertically. FIG. 4C shows a modification in which the millimeter wave radar device 21 and the infrared sensor 22 are arranged laterally. The positional relationship between the millimeter wave radar device 21 and the infrared sensor 22 in the vertical direction may be changed to be reversed from that in FIG. 4B. The positional relationship between the millimeter wave radar device 21 and the infrared sensor 22 in the lateral direction may be changed to be reversed from that in FIG. 3D.

In either of the modifications shown in FIG. 4A and FIG. 4B, since the cover 24 does not require the third cover portion 29, the vertical dimension of the vehicle sensor unit 20 is shorter than that in the above-described embodiment and the modifications in FIG. 3A and FIG. 3B.

Moreover, in the modification of FIG. 4C, since the cover 24 does not require the third cover portion 29, the lateral dimension of the vehicle sensor unit 20 is shorter than that of the modifications of FIG. 3C and FIG. 3D.

Figure 5A:
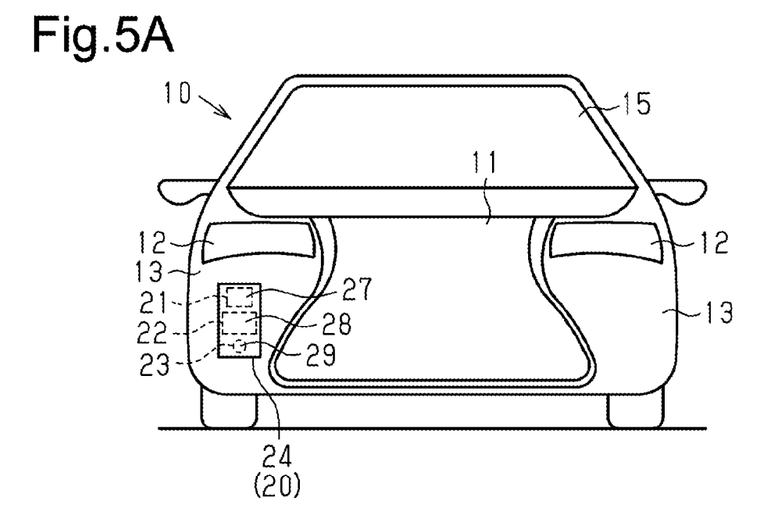
FIG. 5A is a front view of a vehicle equipped with a vehicle sensor unit of a modification installed in a bumper-integrated fender.

The installation position of the vehicle sensor unit 20 may be changed to a position different from that of the radiator grille 11 on condition that the installation position of the vehicle sensor unit 20 is at the front end of the vehicle 10. FIG. 5A shows a modification in which the vehicle sensor unit 20 is installed in the bumper-integrated fender 13.

Figure 5B:
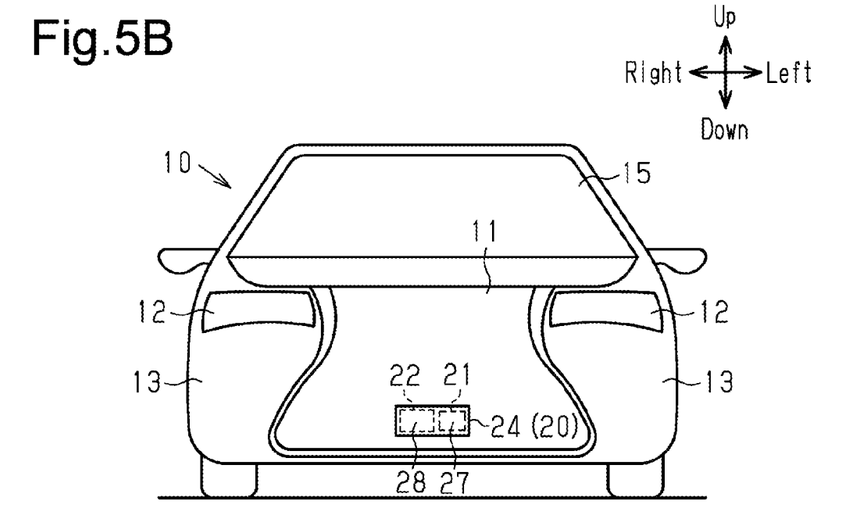
FIG. 5B is a front view of a vehicle equipped with a vehicle sensor unit of a modification installed in a lower portion of the radiator grille.

The installation position of the vehicle sensor unit 20 may be changed to a point different from the upper portion on condition that the installation position is in the radiator grille 11. FIG. 5B shows a modification in which the vehicle sensor unit 20 is installed in a lower portion of the radiator grille 11. The millimeter wave radar device 21 and the infrared sensor 22 are arranged laterally. In this case, as shown in FIG. 5B, the camera 23 may be omitted from the vehicle sensor unit 20. Also, although not illustrated, the camera 23 may be arranged to be adjacent to one of the infrared sensor 22 and the millimeter wave radar device 21 or may be arranged between the infrared sensor 22 and the millimeter wave radar device 21.

In a case in which it is possible to form a portion having both millimeter wave transparency and infrared light transparency in the cover 24, that portion may function as both the first cover portion 27 and the second cover portion 28. In this case, the cover 24 can be made smaller than that in the above-described embodiment, so that the vehicle sensor unit 20 can be made more compact.

A so-called stereo camera may be employed as the camera 23. A stereo camera includes two cameras 23 arranged at a distance. The two cameras 23 each have an imaging device. In this case, three-dimensional information can be collected through the images around the vehicle 10 captured by the two cameras 23.

The second cover portion 28 may have a reflection suppression layer. The reflection suppression layer reduces the reflection of infrared light and prevents reduction of the amount of infrared light that passes through the cover due to reflection.

A hard coating layer with a hardness greater than that of the cover main body 25 may be formed on the front surface of the cover main body 25. The hard coating layer improves the impact resistance of the cover main body 25 and prevents the front surface of the cover main body 25 from being damaged by kicked-up pebbles or the like. In addition, the hard coating layer improves the weather resistance of the cover main body 25 and prevents the cover main body 25 from being deteriorated or being degraded due to sunlight, weather, temperature change, and the like.

The cover main body 25 may have an antifog layer. The antifog layer suppresses condensation of water vapor in the air on the cover main body 25 even if the cover main body 25 is cooled and the temperature falls below the dew point. The antifog layer prevents the sensing function of the millimeter wave radar device 21 and the infrared sensor 22 from being hindered by condensation, thereby maintaining the detection accuracy.

The vehicle sensor unit 20 is also applicable to a vehicle 10 having no radiator grille 11, for example, a rear-wheel drive vehicle. In this case, the vehicle sensor unit 20 can be installed below a headlight 12, in the bumper, or in a fender at the front end of the vehicle 10. The point is that the vehicle sensor unit 20 can be mounted at any position in the front end of the vehicle 10.

The vehicle sensor unit 20 may be installed at an outer end different from the front end of the vehicle 10, for example, at the rear end to detect the environment of the vehicle 10.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A vehicle sensor unit configured to be installed at an outer end of a vehicle and having a function of detecting an environment of the vehicle, the vehicle sensor unit comprising:
    a millimeter wave radar device having a sensor function of transmitting millimeter waves to outside of the vehicle and receiving millimeter waves that have struck and been reflected by an object outside the vehicle;
    an infrared sensor that is arranged at a position adjacent to the millimeter wave radar device and is configured to transmit infrared light to outside of the vehicle and to receive infrared light that has struck and been reflected by an object outside the vehicle; and
    a cover having a first cover portion and a second cover portion, wherein
    the first cover portion is located in front of the millimeter wave radar device in a transmission direction of the millimeter waves to conceal the millimeter wave radar device and has millimeter wave transparency,
    the second cover portion is located in front of the infrared sensor in a transmission direction of the infrared light to conceal the infrared sensor and has infrared light transparency,
    the millimeter wave radar device and the infrared sensor are attached to the cover so that the whole vehicle sensor unit is configured as a single unit,
    the cover includes a cover main body, a colored support portion, and a decorative layer,
    the cover main body includes a front surface that is configured to be exposed to the outside of the vehicle,
    the support portion includes a cover plate portion that is located behind the cover main body,
    the decorative layer is formed on a rear surface of the cover main body, the decorative layer being composed of a colored coating film,
    the first cover portion is constituted by the cover main body, the decorative layer, and the cover plate portion, and
    the second cover portion is constituted by the cover main body and the decorative layer.

2. The vehicle sensor unit according to claim 1, comprising a camera that is arranged at a position adjacent to one of the millimeter wave radar device and the infrared sensor to be attached to the cover and is configured to capture images of the environment of the vehicle,
    wherein the cover includes a third cover portion that is located in front of the camera in an image capturing direction and has visible light transparency.

3. The vehicle sensor unit according to claim 1, wherein the first cover portion is adjacent to the second cover portion.

4. The vehicle sensor unit according to claim 3, wherein a front surface of the first cover portion in the transmission direction of the millimeter waves and a front surface of the second cover portion in the transmission direction of the infrared light are connected to each other while being flush with each other.

5. The vehicle sensor unit according to claim 1, wherein the outer end of the vehicle is a radiator grille.

6. A vehicle sensor unit configured to be installed at an outer end of a vehicle and having a function of detecting an environment of the vehicle, the vehicle sensor unit comprising:
    a millimeter wave radar device having a sensor function of transmitting millimeter waves to outside of the vehicle and receiving millimeter waves that have struck and been reflected by an object outside the vehicle;
    an infrared sensor that is configured to transmit infrared light to outside of the vehicle and to receive infrared light that has struck and been reflected by an object outside the vehicle;
    a camera that is configured to capture images of the environment of the vehicle; and
    a cover having a first cover portion, a second cover portion, and a third cover portion, wherein
    the first cover portion is located in front of the millimeter wave radar device in a transmission direction of the millimeter waves to conceal the millimeter wave radar device and has millimeter wave transparency,
    the second cover portion is located in front of the infrared sensor in a transmission direction of the infrared light to conceal the infrared sensor and has infrared light transparency,
    the third cover portion is located in front of the camera in an image capturing direction and has visible light transparency,
    each of the millimeter wave radar device, the infrared sensor, and the camera is adjacent to at least one of the other two,
    the millimeter wave radar device, the infrared sensor, and the camera are attached to the cover so that the whole vehicle sensor unit is configured as a single unit,
    the cover includes a cover main body, a colored support portion, and a decorative layer,
    the cover main body includes a front surface that is configured to be exposed to the outside of the vehicle,
    the support portion includes a cover plate portion that is located behind the cover main body,
    the decorative layer is formed on a rear surface of the cover main body, the decorative layer being composed of a colored coating film,
    the first cover portion is constituted by the cover main body, the decorative layer, and the cover plate portion, and
    the second cover portion is constituted by the cover main body and the decorative layer.

7. The vehicle sensor unit according to claim 6, wherein the first cover portion is adjacent to the second cover portion.

8. The vehicle sensor unit according to claim 7, wherein a front surface of the first cover portion in the transmission direction of the millimeter waves and a front surface of the second cover portion in the transmission direction of the infrared light are connected to each other while being flush with each other.

9. The vehicle sensor unit according to claim 6, wherein the outer end of the vehicle is a radiator grille.

* * * * *